Jan. 20, 1970 — A. H. BELL III — 3,490,746
GAS TURBINE ENGINE
Filed Dec. 6, 1967 — 2 Sheets-Sheet 2

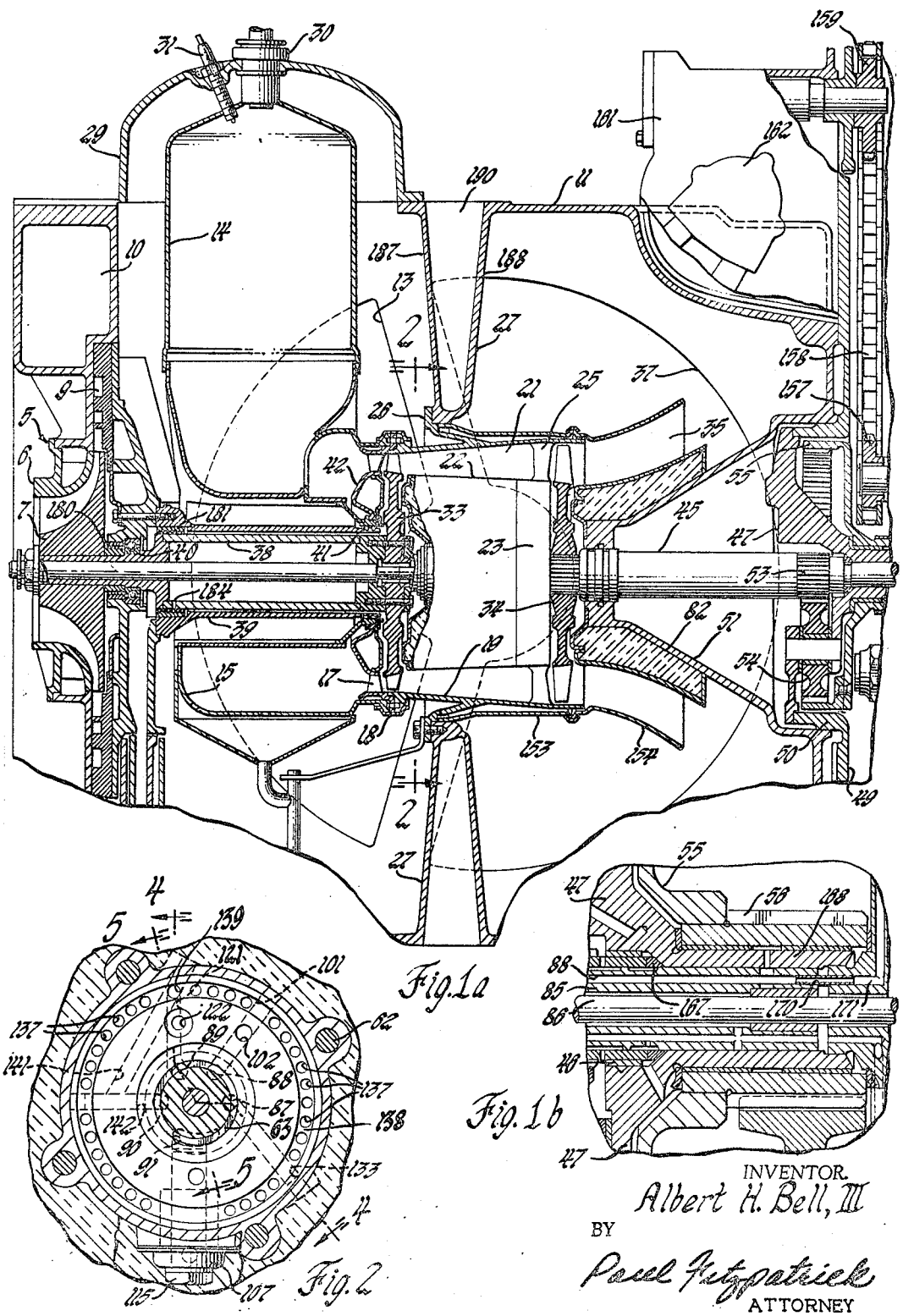

INVENTOR.
Albert H. Bell, III
BY Paul Fitzpatrick
ATTORNEY

United States Patent Office 3,490,746
Patented Jan. 20, 1970

3,490,746
GAS TURBINE ENGINE
Albert H. Bell III, Birmingham, Mich., assignor to General Motors Corporation, Detroit, Mich., a corporation of Delaware
Filed Dec. 6, 1967, Ser. No. 688,498
Int. Cl. F01d 1/30, 1/00
U.S. Cl. 415—177
26 Claims

ABSTRACT OF THE DISCLOSURE

A gas turbine engine of the gas-coupled type has a central bearing housing disposd within the motive fluid duct between the high pressure gas generator turbine and the low pressure power output turbine. The two turbines have a rigid common case and the bearing housing is supported from the case through the vanes of the power turbine nozzle. Bearings for the shafts of the two turbines are located in the housing.

The power turbine shaft is hollow and a fixed heat and fluid transfer member is disposed within the shaft extending into the reduction gear case of the engine. This member conducts lubricating oil to and from the bearings within the housing, conducts cooling oil to and from the housing, and may deliver air to pressurize seals adjacent the bearings. The bearing housing and transfer member constitute a heat sink. Upon shutdown of the engine, heat soaking from the hot turbine wheels and case into the bearing housing is largely absorbed and carried away to the gear case by the heat sink.

The transfer member is hollow and houses a power transfer shaft by which the gas generator and power turbines may be coupled, and which may drive accessories from the gas generator turbine.

The bearing housing defines numerous coolant passages adjacent its outer surface through which the cooling oil is circulated when the engine is running.

---

My invention relates to gas turbine engines, and primarily to improvements in the turbine structure of such engines to provide improved turbine bearing support services; that is, the supply of lubricating and cooling oil and seal pressurizing air to such bearings; and to provide for relief of the turbine bearings from heat soaking from the hot parts upon shutdown of the engine.

My invention is preferably incorporated in a gas-coupled gas turbine engine incorporating gas generator and power turbines, of a general configuration previously known. However, in such gas turbines, it has been customary to overhang the turbines from bearings located forward of the gas generator turbine and rearward of the power turbine. In this case, ordinarily, the two turbines are more or less indirectly supported and aligned, and are coupled by a duct incorporating a flexible section or yieldable seal. It has also been known to provide bearings between two turbine wheels serviced by oil and other conduits extending across the motive fluid annulus into the space between the wheels. This leads to a measure of obstruction of the motive fluid path by oil lines running through the hot parts of the engine and undesirable heating of the oil in these lines.

In some prior art engines, the problem of oil and bearing overheating after shutdown of the engine has been solved by continuing forced circulation of oil after shutdown. This expedient is undesirable because of undue complexity and cost in an engine for industrial or vehicular use.

It should be borne in mind that the first stage nozzle of a gas turbine engine may be at quite high temperatures, up to 1400° F. in normal full power operation of the engine. During engine operation, the turbine bearings ordinarily are cooled by circulation of oil which also flows through an external cooler. However, oil pumps driven by the engine cease to operate upon shutdown of the engine. In such case, unless some further provision is made, the temperatures of the bearings may rapidly rise to about 800° to 900° F. and remain at a high temperature for as long as an hour. This is extremely undesirable, since it results in coking of the oil and damage to the bearings of the engine. In aircraft turbines, special high temperature resisting synthetic lubricants are used, but these are expensive and undesirable for industrial and vehicle turbines.

According to my invention, these problems and disadvantages of prior art engines are solved primarily by the use of a heat sink which includes a bearing housing of high heat capacity and a fixed shaft or transfer member of relatively highly heat conductive metal which extends through one of the turbine shafts from the housing to an area outside the turbines. The transfer member is used to supply oil for lubrication and cooling to the bearings and may conduct seal pressurizing air as desired. It has been found by test that, upon shutdown of the engine, the heat soaking into the interior of the turbine is rapidly absorbed and conducted away by the heat sink, which reduces the turbine bearing temperature by a factor of several hundred degrees. In connection with the heat sink, structures such as insulation and heat dams to minimize the effective heat conductance between the hot turbine parts and the bearings are also desirable. Thus, in short, my invention reduces the temperatures within the engine upon shutdown by the provision of heat dams and insulation to minimize conduction to the bearings and by the provision of a heat sink and conducting member to carry away and absorb a large portion of the heat that passes through the heat shielding structure to the bearing housing.

The principal objects of my invention are to simplify gas turbine engines and to render them less expensive and more suitable for commercial and industrial service. A further object of my invention is to provide an improved turbine mount and bearing support. A still further object of the invention is to provide improved arrangements for servicing bearings in a gas turbine engine. A further object is to provide means to minimize temperature rise in the bearings and oil circuits of a gas turbine engine upon shutdown. A still further object of the invention is to obviate the need for forced cooling measures in an engine after shutdown. It is also an object to provide a gas turbine suited for use of commercial petroleum-base lubricants including transmission oils.

The nature of my invention and its advantages will be clear to those skilled in the art from the succeeding detailed description of the preferred embodiment of the invention and the accompanying drawings thereof.

FIGURE 1a is a side elevation view of the forward portion of a gas turbine engine, with parts cut away and in section along a vertical plane containing the axis of the engine.

FIGURE 1b is a rearward extension of FIGURE 1a.

FIGURE 2 is a cross sectional view of a bearing housing taken on the plane indicated by the line 2—2 in FIGURE 1a.

Figure 3:
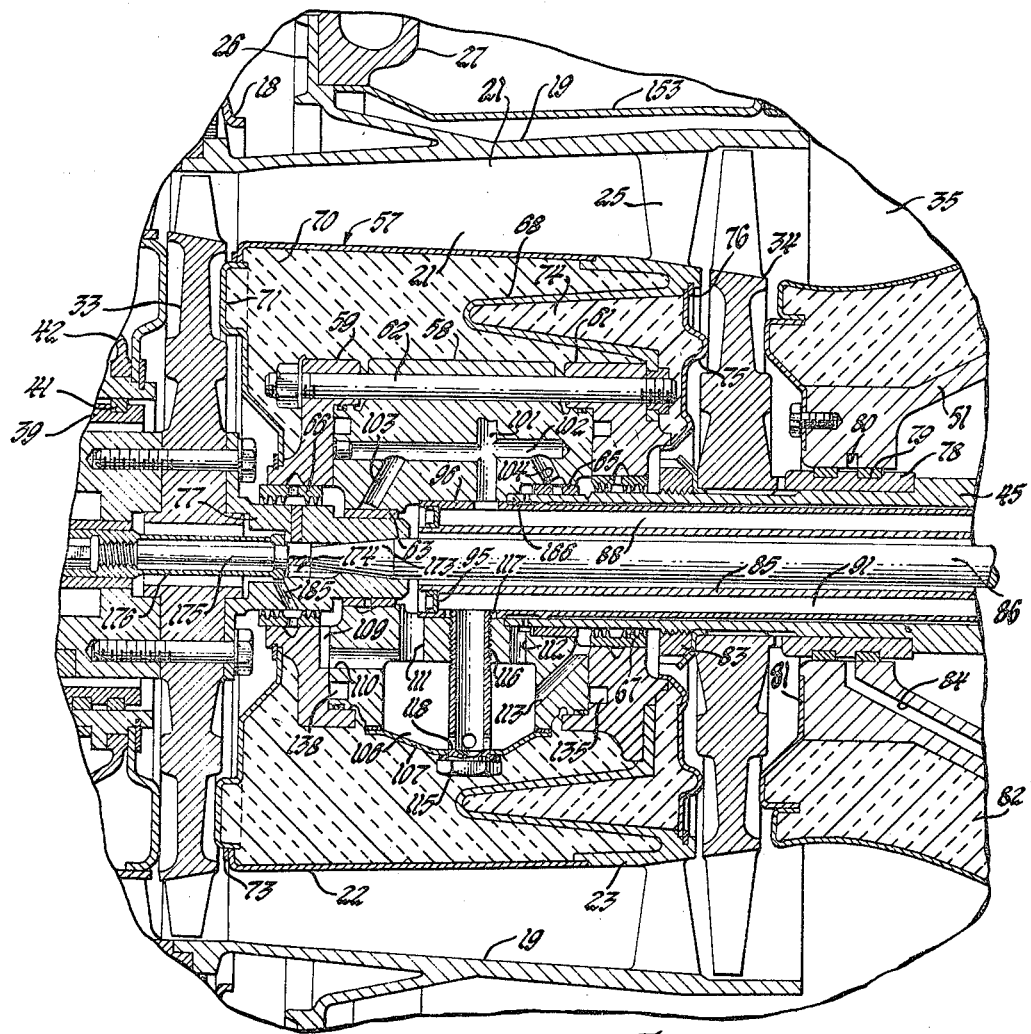
FIGURE 3 is an enlarged sectional view of the turbines taken in a vertical plane containing the axis of the engine.
Figure 4:
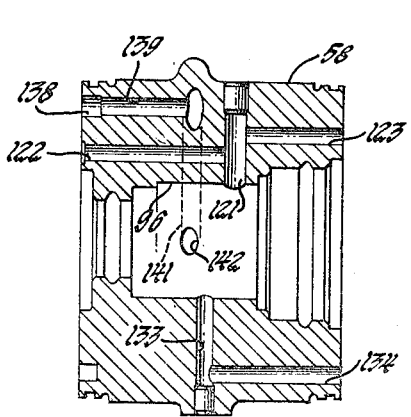
FIGURE 4 is a longitudinal section taken in the broken plane indicated by the line 4—4 in FIGURE 2.
Figure 5:
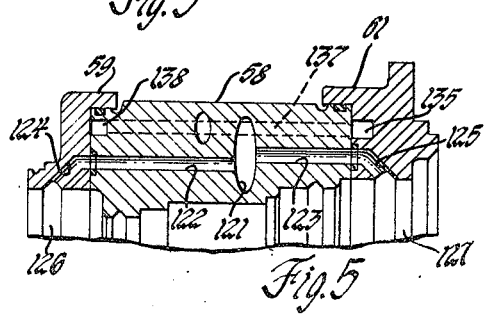
FIGURE 5 is a longitudinal sectional view taken on the plane indicated by the line 5—5 in FIGURE 2.

By way of introduction to the detailed description of the preferred embodiment of my invention, it may be mentioned that it is embodied in a regenerative gas-coupled gas turbine engine which is developed from and is similar in some respects to the engine which is the subject of U.S. Patent No. 3,267,674 of Collman et al. issued Aug. 23, 1966. That patent and patents referred to in the specification of the patent provide background information on the structure and principles of regenerative gas turbine engines.

Proceeding to a general description of the engine in which my invention is embodied, with reference to FIGURE 1a of the drawings, it will be seen that the engine includes a radial-flow compressor 5 having a case 6 and a rotor 7. The compressor discharges into an annular diffuser 9 which in turn discharges into an annular plenum chamber 10 mounted on the forward wall of a generally rectangular engine block or case 11. The compressed air flows from the plenum 10 through axial-flow regenerator matrices (not illustrated) mounted at each side of the case 11 and rotating about a horizontal axis. Suitable regenerator structure is illustrated in patent applications, of common ownership with this application, Ser. No. 655,174 for Regenerator Seals of Bracken and Zeek, filed July 21, 1957, Patent No. 3,368,611 and Ser. No. 661,075 for Rotary Regenerator Matrix Mount and Drive of Bracken and Hubble filed Aug. 16, 1967.

The compressed air, heated by passing through the regenerator, enters the interior of the case 11 through an opening 13 at each side and flows into a combustion liner 14 within which fuel is burned and from which the combustion products flow through a scroll 15 into a first stage or gas generator turbine nozzle 17 on which the scroll is mounted. This nozzle is a unitary cast structure piloted into a turbine case 19 and attached to it by a V-band clamp 18. Case 19 defines the outer wall of an annular motive fluid conduit 21 extending downstream from the nozzle 17. The inner wall of the conduit is defined by a sheet metal wall 22 and by the inner shroud 23 of a second turbine nozzle which includes radial vanes 25. The turbine case has an integral annular flange 26 which is bolted to the bulkhead 27, a part of the engine case 11 extending from the outer walls to the turbine case and separating the high pressure and low pressure portions of the engine.

Returning to the combustion apparatus, combustion liner 14 is mounted under a removable combustion chamber cover 29 which mounts a fuel nozzle 30 to inject fuel into the liner and an electrical igniter 31. The combustion products developed in the combustion liner flow through the scroll 15, nozzle 17, the blades of a first or gas generator turbine wheel 33, the motive fluid conduit 21, nozzle vanes 25, and the blades of a second or power turbine wheel 34. The exhaust from this turbine wheel flows through an annular diffusing passage 35 into the space rearward of the bulkhead 27, from which it flows through arcuate openings 37 at each side of the engine case, through the regenerator matrix disks, and to an exhaust structure (not illustrated).

The compressor 5, turbine 17, 33, shaft 38 which connects these two, and combustion chamber 14 are the principal parts of a gas generator which serves to provide hot gas to energize the power output turbine wheel 34. Compressor rotor 7, shaft 38, and turbine wheel 33 constitute a gas generator rotor. The gas generator shaft 38 is rotatably mounted in a forward ball bearing 40 in a shaft housing 39 and in a rear bearing aft of turbine wheel 33, to be described. Shaft housing 39 bears piston ring seals 41 within the inner diameter of diaphragm 42 extending inward from nozzle 17.

The power turbine wheel 34, which rotates independently of wheel 33, is fixed on a power turbine shaft 45, the forward end of which is supported in a bearing to be described ahead of the turbine, and the rear end of which is supported in a bearing 46 mounted in a bearing support 47, which in turn is fixed to the forward wall of a gear case 49. The gear case 49 bolts to the rear end of the engine case 11 and includes a pilot portion 50 which extends into an opening at the rear of the engine case. The case 11 includes a conical power shaft housing 51 which surrounds but does not support the power turbine shaft 45. The power turbine shaft 45 has sun gear teeth 53 cut near the rear end of the shaft. The sun gear drives planet gears 54 mounted on shafts fixed on the support disk 47, which in turn drive a ring gear 55. The ring gear and a pinion 56 fixed to it are journaled on the support 47 and may in turn drive further reduction and accessory drive gearing which are immaterial to the present invention, these gears being contained within the gear case 49.

Referring now mainly to FIGURE 3, the rear gas generator bearing and forward power turbine bearing are mounted in a housing 57, preferably made of cast iron, comprising a body 58, a front cap 59, and a rear cap 61. The caps pilot over the reduced ends of the body and are retained by four studs 62. The body 58 mounts a sleeve bearing 63 for the gas generator shaft and the sleeve bearing 65 for the power turbine shaft. The front cap 59 mounts a two-stage labyrinth seal 66 for the gas generator shaft and rear cap 61 mounts a two-stage labyrinth seal 67 for the power turbine shaft. These seals prevent entry of oil into the turbines and motive fluid into the oil system. Bearings 63 and 65 may be mounted in axial extensions of caps 59 and 61, respectively, rather than directly in body 58.

Studs 62 fix the bearing housing 57 to a support 68 in the form of a folded or recurved ring of relatively thin section metal integral with the inner shroud 23. The relatively great length of the support web 68 from the nozzle to the bearing housing minimizes direct transmission of heat through the support and also the recurved configuration makes it more tolerant of the temperature and expansion differences between the cooled bearing housing and the very hot turbine nozzle. It can bear the temperature gradient with minimum stress.

Thermal insulation is also provided isolating the bearing housing 57 from the motive fluid path and turbine wheels. Insulation 70 disposed within the inner wall 22 is contained by a cover 71 which also engages and retains the wall 22 on the shroud 23. The cover 71 is held in place by a contracting snap ring 73. Cover 71 acts also as a heat shield between the turbine wheel 33 and the bearing housing. Insulation 74 disposed within the convolution of the support 68 and over the rear face of rear cap 61 is contained by a heat shielding cover 75 retained by a expanding snap ring 76 in the inner shroud 23.

The bearing 63 and seal 66 cooperate with cylindrical surfaces of a stub shaft 77 piloted and bolted onto the rear face of gas generator turbine wheel 33. Power turbine shaft 45 mounts a seal ring 78 within which are mounted piston ring seals 79 cooperating with the inner surface of the forward end of shaft housing 51. A groove 80 between these seals is pressurized from the engine compressor through a passage 84 in power shaft housing 51.

The inner wall 81 of the exhaust diffuser 35 is mounted on the forward end of shaft housing 51 by bolts, and thermal insulation 82 is contained between the diffuser and housing to minimize transfer of heat from the exhaust gas to the power output shaft and its bearing. Turbine wheel 34 is splined to shaft 45, abutting seal ring 78, and is retained by a nut 83. The shaft extends forwardly of nut 83 to provide a cylindrical surface cooperating with labyrinth seal 67 and a clindrical journal in bearing 65.

A generally hollow annular transfer member 85 extends from the bearing housing 57 through the power turbine rotor, including the wheel 34 and shaft 45, into the gear case 49. This transfer member is provided to conduct fluids to and from the bearing housing and to conduct heat from the bearing housing and act as a heat sink. In the preferred embodiment of the engine, the transfer member is hollow to house a power transfer shaft 86 to be described. The transfer member 85 is an extrusion of a highly conductive metal such as aluminum or copper having a number of passages extending lengthwise through the transfer member. Referring also to FIGURE 2, these passages are a coolant supply passage 87, a lubricating oil supply passage 88, an air supply passage 89, a coolant return passage 90, and a lubricating oil return passage 91, this last being of greater size than the others. These are connected to appropriate services at the gear case end of the transfer member (FIGURE 1b) and are closed at the forward end by plugs such as 95.

The transfer member is not a structural member and does not support the shafts or bearings or the bearing housing 57. It is supported by the bearing housing, the front end of the transfer member being piloted with a shrink fit at 96 in the inner diameter of the body 58. Transfer member 85 extends from with the gear case 49 with a slight clearance through the shaft 45 and has a relatively small clearance from the power transfer shaft 86.

Considering first the circuit for lubricating oil, this is supplied by a suitable pump (not shown), which may be driven by the gas generator turbine through shaft 86, and flows through passage 88 and drilled oil passages 101, 102, 103 and 104, to annular grooves surrounding the sleeve bearings 63 and 65, respectively. These bearings have the usual radial passages through the bearings by which oil is supplied to the bearing face. Oil escaping from the ends of the bearings is returned to a sump 106 in the lower part of body 58, the sump being defined primarily by a pan 107 closing a recess in the lower part of body 58. The spent oil may return to sump 106 in the obvious manner through passages 109, 110, 111, 112, and 113. The pan 107 is retained by a hollow bolt 115 which is threaded at 116 into the body 58 below the transfer member 85 and which extends with clearance into an opening 117 in the lower surface of the transfer member through which it communicates with the oil return passage 91. Bolt 115 has ports 118 by which the oil enters. The oil is delivered from the sump by the pressure exerted by air leaking from the shaft seals or by compressed air from passage 89, so that no sump pump is needed. The same oil used to lubricate the reduction gear and accessory gearing is used to lubricate the turbine shaft bearings.

Compressed air, which preferably is bled from the compressor of the engine, may be supplied to the bearing housing 57 through the passage 89 which lies behind passage 88 in FIGURE 3. This communicates through an opening in the wall of transfer member 85 with a radial passage 121 in the body 58 which in turn communicates with axially extending passages 122 and 123 which connect to passages 124 in the front cap 59 and 125 in the rear cap 61. These passages conduct the air to annular recesses 126 and 127 encircling the labyrinth seals 66 and 67, respectively. The air is delivered to the interior of the seals through radial ports in the labyrinth seal rings, and the air thus may leak through the labyrinth seals in either direction from the center. The slight flow from the rear end of seal 67 prevents leakage of motive fluid from the turbine into the bearing housing and the slight leakage out the front of the seat 67 prevents leakage of oil from bearing 65 into the turbine. Similarly, leakage forwardly through seal 66 prevents leakage of motive fluid from turbine 33 into the bearing housing and leakage rearwardly prevents escape of lubricating oil from bearing 63 into the turbine. The air escaping into the bearing housing flows into the sump, pressurizing the oil, and excess air flows away with the oil through the return passage 91.

Turbine bearing cooling oil is circulated while the engine is operating from a suitable pump, preferably the lubricating oil pump. The cooling oil flows forwardly through the transfer member 85, specifically through a passage 87 which connects through a radial port in the transfer member with a plugged radial passage 133 in the body 58. Passage 133 connects through an axial passage 134 in the body 58 with an annular recess 135 in the forward face of rear cap 61. This recess communicates with a large number of cooling oil passages 137 extending parallel to the turbine axis near the outer surface of body 58 and terminating in an annular recess 138 in the forward face of that body. The forward end of recess 138 is closed by the front cap 59. The cooling oil is returned through a series of drilled passages 139, 141, and 142 to the axial passage 90 in the transfer member from which it is returned to the pump through a suitable cooler (not illustrated). The flow of cooling oil through the outer surface of the bearing support carries heat away as it is conducted into the support during operation of the engine and minimizes conduction of heat to the bearings 63 and 65 and to the oil which lubricates these bearings.

It will be noted that O-rings are provided around the outer diameter of the body 58 cooperating with the caps 59 and 61 to prevent any leakage of the cooling oil. Considering some additional details shown on the drawings, a heat shield 153 surrounding the turbine case 19 is fixed to the bulkhead 27. The outer wall 154 of the turbine exhaust diffuser is mounted on the heat shield 153.

The power transfer shaft 86 may be coupled to the power turbine shaft 45 through suitable mechanism (not illustrated) under suitable control responsive to operating conditions, as explained in U.S. Patent No. 3,237,404 of Flanigan et al., to effectuate power transfer between the gas generator and power turbines. Shaft 86 is also used to drive various engine auxiliaries, most of which are not illustrated. Through suitable gearing (not illustrated) shaft 86 drives a sprocket 157 which drives a sprocket 159 through a chain 158. Sprocket 159 is the input to a reduction gear 161 which slowly drives the regenerator disks through chain drives housed in housing 162 partially illustrated.

A thrust ring 166 mounted in bearing housing 57 may cooperate with the forward end of power turbine shaft 45 as a thrust bearing. However, the thrust of this shaft, due to gas loads on the turbine and gearing thrust, is rearward in normal operation of the engine. A thrust bearing 167 in contact with the rear face of shaft 45 adjacent sleeve bearing 46 normally locates the shaft and takes the thrust.

The transfer member 85 extends out of the rear end of power turbine shaft 45 and is mounted in a sleeve 168 extending from the support disk 47, this sleeve 168 also serving to journal pinion 56 and ring gear 55 of the main power output gearing. The various air and oil conduits are connected into the transfer member 85 at its rear end, the connection for the oil line 88 being shown in FIGURE 1b. A sleeve 170 brazed or otherwise fixed in the end of the transfer member plugs into an oil connection 171 on part of the fixed structure of the gear box assembly. Similar means are provided for connecting the other lines which supply and return the cooling and lubricating oil.

The transfer member 85 thus extends entirely through the power turbine shaft and terminates in the gear case into which it can transfer heat which the transfer member receives from the bearing housing 57 and from the turbine wheels and the power turbine shaft 45. The function of the bearing housing 57 and the transfer member 85 is to absorb heat from the hotter parts of the engine and to conduct it away to the heat sink provided by the gear box, in addition to the fact that the bearing housing and transfer member also function as heat sinks. Thus, upon shutdown of the engine, these parts which are kept relatively cool by the circulating oil during operation of the engine heat up quite substantially, but not sufficiently to coke the oil or cause damage to the bearings. As a result, it is not necessary to provide special provisions for cooling the engine upon shutdown such as the conventional expedient of a pump operating after engine shutdown to circulate a coolant. Also, ordinary transmission oil can be used.

Mention may also be made of the arrangement for connecting the power transfer shaft 86 to the gas generator turbine wheel 33. The power transfer shaft has a tapered front end 173 which fits in a correspondingly tapered socket in the gas generator turbine stub shaft 77. A key 174 locks the two against relative rotation. The power transfer shaft continues forward as a stem 175, the forward end of which is threaded and receives a long sleeve-shaped nut 176, the rear end of which bears against a shoulder in the interior of stub shaft 77. Since the stem on the end of the shaft can stretch slightly and the nut can compress slightly, these parts provide some elasticity in the connection between the turbine wheel 33 and the power transfer shaft to prevent undue stresses or loosening caused by temperature variations.

It has been explained that air to pressurize the seals 66 and 67 and to scavenge the oil from the bearing housing may be supplied through the transfer member 85. This pressurizing air may supplement seal leakage air from adjacent the compressor 5 or, if the compressor seal leakage air is sufficient for pressurizing the seals 66 and 67 and scavenging, the arrangement for supplying air through passage 89 may be omitted. Also, other means for scavenging the oil could be employed. It is, of course, relatively simple to control the supply of air to the passage 89, whereas control of seal leakage from the compressor is somewhat uncertain and leakage may vary with wear of the seals.

In the preferred embodiment of the engine, there is a labyrinth seal 180 ahead of the front bearing 40 of gas generator shaft 38 and a second labyrinth seal 181 behind this bearing, thus isolating the bearing and the oil which lubricates it, the arrangements for which are not illustrated, from the compressor and from the interior of shaft housing 39. Seal 180 is pressurized by air leaking through the gap between the rotor 7 and case 6 of the compressor and seal 181 may be pressurized by any suitable connection from the compressor similar to connection 84 in FIGURE 3 (not illustrated). Air leaking from seal 181 to the interior of the shaft housing may flow through ports 184 in shaft 38 from which the leakage air flows rearwardly through the shaft and through the hollow interior of turbine wheel 33, around nut 176, into stub shaft 77. Radial ports 185 in the stub shaft permit this air to discharge into the middle of labyrinth seal 66. This air may then flow axially out of the ends of seal 66, and also radially through ports in the seal into the annulus 126 from which it may be distributed through passages 124, 122, 123 and 125 to the power turbine labyrinth seal 67.

There are, thus, two possible sources of pressurizing air for the labyrinth seals within shaft housing 67 which may be used alternatively or conjunctively. Also, if desired, the labyrinth seal 181 adjacent the compressor may be pressurized by air flowing through the supply passage 89 in the transfer member, radially inward through the passages in seal 66 and ports 185 in the stub shaft, and forward through shaft 38 into seal 181.

The bulkhead 27 is a generally double-walled structure having a forward wall 187 and a rear wall 188 which define between them a vertical chimney-like passage 190 open at the top and bottom of the engine so that air can circulate by convection or, if desired, may be circulated through the bulkhead by a fan or blower.

The suitability of the gas turbine engine according to the preferred embodiment of the invention for industrial and vehicular uses and the utility and value of my invention will be clear to those skilled in the art from the foregoing detailed description of the preferred embodiment of the invention. It will be clear that the principles of the invention are particularly adapted to simplify the structure of, facilitate lubrication of, and solve the cooling problems of, gas turbine engines, particularly those of moderate size for vehicular and industrial use. Various features and aspects of the invention may, of course, be used independently of others, but the combination of the novel features described is considered to be particularly advantageous for vehicle gas turbines. Obviously, fixed recuperators may be used, or the engine may be non-regenerative.

Other modifications of various sorts may be made within the scope of the invention. Particularly, it should be noted that since the transfer member 85 is not a structural member, it is not necessary to be a solid metal bar as in the preferred embodiment. The heat conduction functions of the transfer member could be accomplished by various structures disposed within the power turbine shaft. For example, porous media filled with liquid of a general nature of the structures disclosed in U.S. Patent No. 3,287,906. In such case, of course, the tubes for conduction of air and oil could be disposed within or parallel to the heat conducting medium. In short, any highly conductive structure which may be disposed within the power turbine shaft or, for that matter, the gas generator turbine shaft, may be employed to conduct the heat away from the bearing housing.

Also, while the engine is illustrated as employing sleeve bearings within the bearing housing and these have certain advantages such as compactness, it may be desirable to use rolling contact bearings.

The detailed description of the preferred embodiment of the invention for the purpose of explaining the principles thereof is not to be considered as limiting or restricting the invention, as many modifications may be made by the exercise of skill in the art.

I claim:

1. A gas turbine engine comprising, in combination, a first rotor including a first turbine wheel, a second rotor including a second turbine wheel, means defining an annular conduit for hot motive fluid from the first wheel to the second wheel having radially outer and inner walls, means extending across the conduit supporting the inner wall from the outer wall, a housing disposed between the wheels within the inner wall, means supporting the housing from the inner wall, bearings for the said rotors mounted in the housing, and a transfer member extending from the housing along the axis of one of the rotors to a point exterior to the rotor, the housing and transfer member being adapted to provide a sink and an escape means for soak-back heat upon engine shutdown.

2. An engine as recited in claim 1 including also a gear case and gearing within the case, and in which the transfer member extends into the gear case.

3. An engine as recited in claim 2 in which the transfer member is non-rotatively supported by the housing and gear case.

4. An engine as recited in claim 1 in which the transfer member is made of a metal of relatively high thermal conductivity.

5. An engine as recited in claim 1 in which the housing is made of a metal of relatively high specific heat.

6. An engine as recited in claim 5 in which the transfer member is made of a metal of relatively high thermal conductivity.

7. An engine as recited in claim 1 in which the transfer member is non-rotatable and is connected to the housing so as to provide a good heat path from the housing into the transfer member.

8. An engine as recited in claim 1 in which the transfer member defines at least one conduit for flow of a fluid through the transfer member into the housing.

9. An engine as recited in claim 1 in which the means supporting the housing from the inner wall is a recurved annular web.

10. An engine as recited in claim 1 including also thermal insulation disposed between the wheels and motive fluid conduit and the housing.

11. A gas turbine engine comprising, in combination, a first rotor including a first turbine wheel, a second rotor including a second turbine wheel, means defining an annular conduit for hot motive fluid from the first wheel to the second wheel having radially outer and inner walls, means extending across the conduit supporting the inner wall from the outer wall, a housing disposed between the wheels within the inner wall, means supporting the housing from the inner wall, bearings for the said rotors mounted in the housing, and a transfer member extending from the housing along the axis of one of the rotors to a point exterior to the rotor, the transfer member defining supply and return conduits for at least one fluid servicing the said bearings.

12. An engine as recited in claim 11 in which the fluid is a lubricant for the bearings.

13. An engine as recited in claim 11 in which the fluid is a coolant circulated through the housing.

14. An engine as recited in claim 11 in which the transfer member defines supply and return conduits for a lubricant and defines supply and return conduits for a coolant.

15. An engine as recited in claim 14 in which the transfer member defines also a conduit for a seal pressurizing gas supplied to the housing through the transfer member.

16. An engine as recited in claim 11 in which the transfer member is made of a metal of relatively high thermal conductivity.

17. An engine as recited in claim 11 including also a gear case and gearing within the case, and in which the transfer member extends into the gear case.

18. An engine as recited in claim 17 in which the transfer member is non-rotatively supported by the housing and gear case.

19. A turbomachine comprising, in combination, a first turbine rotor wheel, a second turbine rotor wheel, means defining an annular motive fluid conduit from the first rotor wheel to the second rotor wheel having radially outer and inner walls, means extending across the conduit supporting the inner wall from the outer wall, a housing disposed between the wheels within the inner wall, means supporting the housing from the inner wall, bearings for the said rotor wheels mounted in the housing, a transfer member extending from the housing along the axis of one of the rotor wheels to a point exterior to the wheel, means defining passages for flow of a coolant through the exterior part of the housing, and conduits in the transfer member for supply and return of the coolant.

20. A machine as recited in claim 19 in which the last-recited means includes a manifold adjacent each end of the housing and generally parallel passages extending from one manifold to the other.

21. A machine as recited in claim 19 in which the said passages extend through the portion of the housing adjacent to the said inner wall.

22. A machine as recited in claim 21 in which the housing is spaced from the inner wall, and including thermal insulation disposed between the housing and inner wall.

23. A gas turbine engine comprising, in combination, a first rotor including a first turbine wheel and a shaft driven thereby, a second rotor including a second turbine wheel and a shaft driven thereby, means defining an annular motive fluid conduit from the first turbine wheel to the second turbine wheel having radially outer and inner walls, means extending across the conduit supporting the inner wall from the outer wall, a housing disposed between the turbine wheels within the inner wall, means supporting the housing from the inner wall, bearings for the said shafts mounted in the housing, and a fixed member extending from the housing along the axis of one of the rotors to a point exterior to the rotor, the fixed member extending inside one said shaft and enclosing the other said shaft.

24. An engine as recited in claim 23 in which the fixed member defines conduits for fluid extending into the housing.

25. An engine as recited in claim 23 including also a gear case and gearing within the case, and in which the said shafts and fixed member extend into the gear case.

26. An engine as recited in claim 25 in which the fixed member is made of a metal of relatively high thermal conductivity.

References Cited

UNITED STATES PATENTS

| | | |
|---|---|---|
| 2,648,491 | 8/1953 | Wood. |
| 2,804,280 | 8/1957 | Wheatley. |
| 2,883,151 | 4/1959 | Dolida. |
| 3,087,434 | 4/1963 | Reichenbacher. |
| 3,203,180 | 4/1965 | Price _____ 60—39.16 X |

EDWARD J. MICHAEL, Primary Examiner

PO-1050 (5/69)

UNITED STATES PATENT OFFICE
CERTIFICATE OF CORRECTION

Patent No. 3,490,746      Dated January 20, 1970

Inventor(s) Albert H. Bell III

It is certified that error appears in the above-identified patent and that said Letters Patent are hereby corrected as shown below:

Column 3, line 22, "July 21, 1957" should read -- July 21, 1967 --.

Column 4, line 65, correct "clindrical" to -- cylindrical --.

Column 5, line 16, "with" should read -- within --.

Column 5, line 61, "seat" should read -- seal --.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents